(12) United States Patent
Epaud

(10) Patent No.: US 7,537,260 B2
(45) Date of Patent: May 26, 2009

(54) LAYOUT FOR AN AUTOMOBILE SEAT RETRACTABLE INTO A WELL OF THE FLOOR OF THE SAID AUTOMOBILE AND AUTOMOBILE INCLUDING SUCH A SEAT

(75) Inventor: David Epaud, Cerny (FR)

(73) Assignee: Faurecia Sieges d'Automobile, Nanterre (FR)

( * ) Notice: Subject to any disclaimer, the term of this patent is extended or adjusted under 35 U.S.C. 154(b) by 0 days.

(21) Appl. No.: 11/941,995

(22) Filed: Nov. 19, 2007

(65) Prior Publication Data
US 2008/0129072 A1 Jun. 5, 2008

(30) Foreign Application Priority Data
Nov. 17, 2006 (FR) .................................. 06 54970

(51) Int. Cl.
*B60N 2/10* (2006.01)
(52) U.S. Cl. ..................... 296/65.09; 297/15
(58) Field of Classification Search .................. 296/63, 296/64, 66, 37.14, 37.16, 65.05, 65.08, 65.09, 296/65.13, 65.16, 65.03; 297/15, 340
See application file for complete search history.

(56) References Cited

U.S. PATENT DOCUMENTS

| | | | | |
|---|---|---|---|---|
| 5,195,795 | A * | 3/1993 | Cannera et al. | 296/65.09 |
| 5,269,581 | A | 12/1993 | Odagaki et al. | |
| 5,868,451 | A * | 2/1999 | Uno et al. | 296/66 |
| 5,975,612 | A * | 11/1999 | Macey et al. | 296/66 |
| 6,030,042 | A * | 2/2000 | Bauer et al. | 297/341 |
| 6,644,730 | B2 * | 11/2003 | Sugiura et al. | 297/15 |
| 6,705,658 | B2 * | 3/2004 | Jach et al. | 296/65.09 |
| 6,869,138 | B2 * | 3/2005 | Rhodes et al. | 297/15 |
| 6,896,309 | B2 * | 5/2005 | Satoh et al. | 296/65.09 |
| 7,213,861 | B2 * | 5/2007 | Yokoyama et al. | 296/65.09 |
| 7,237,837 | B2 * | 7/2007 | Queveau et al. | 297/15 |
| 7,240,950 | B2 | 7/2007 | Fourrey et al. | |
| 7,252,320 | B2 * | 8/2007 | Tsujibayashi et al. | 296/65.09 |

(Continued)

FOREIGN PATENT DOCUMENTS

FR    2 829 441 A1    3/2003

(Continued)

*Primary Examiner*—Jason S Morrow
(74) *Attorney, Agent, or Firm*—Young & Thompson

(57) ABSTRACT

Layout for an automobile vehicle seat retractable into a stowage well (41) made in the floor (4) of the said vehicle, the seat including a backrest (2) foldable onto the seat pan (1) and the seat pan being movable on the floor by pivoting towards the rear between a current utilization position and a retracted position in which the seat pan is located in the well more or less horizontal, the bottom of the seat facing upwards and the backrest then being below the seat pan in the bottom of the well. The seat pan (1) is supported by a seat pan support (3) which is hinged on the floor (4) to allow the said pivoting to the seat pan, and the backrest (2) is connected to the floor of the vehicle by a first rod (6) hinged on the backrest and on the floor respectively so that the pivoting of the seat pan towards the rear is accompanied by the pivoting of the backrest towards the seat pan and the pivoting of the seat pan towards the front is accompanied by the deployment of the backrest.

9 Claims, 3 Drawing Sheets

U.S. PATENT DOCUMENTS

Figure 1:
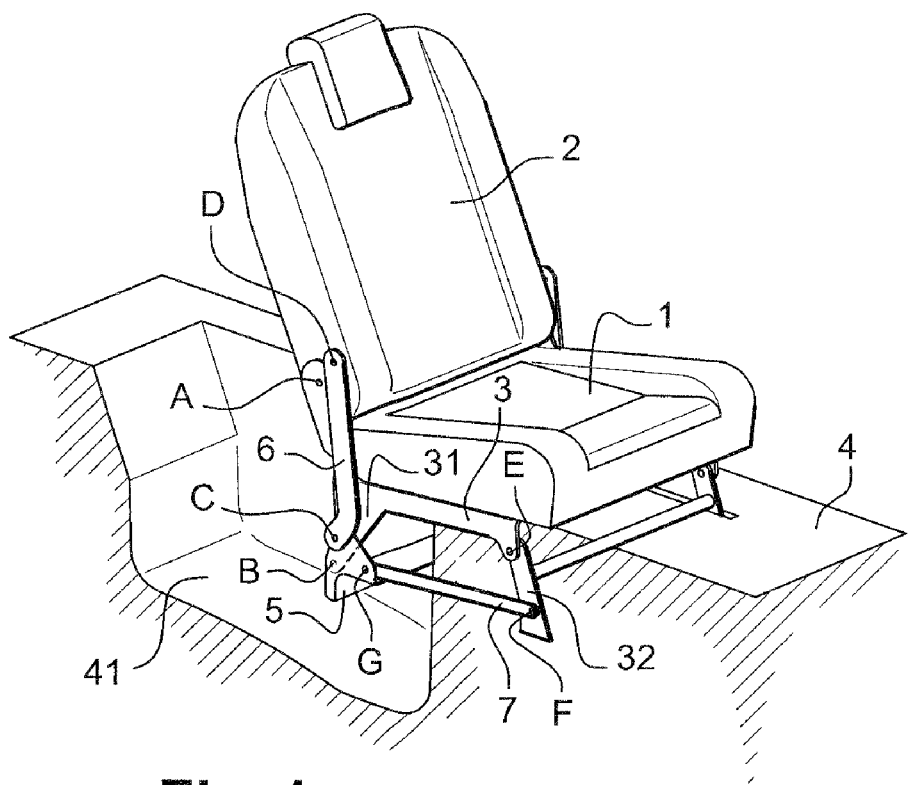

| | | | |
|---|---|---|---|
| 7,328,939 B2 * | 2/2008 | Moriyama et al. | 297/15 |
| 7,374,222 B2 * | 5/2008 | McLaughlin et al. | 296/65.09 |
| 2001/0026075 A1 | 10/2001 | Shimizu et al. | |
| 2002/0047287 A1 * | 4/2002 | Kawasaki | 296/64 |
| 2003/0094830 A1 * | 5/2003 | Kamida et al. | 296/65.09 |
| 2004/0100115 A1 | 5/2004 | Rhodes et al. | |
| 2004/0174038 A1 * | 9/2004 | Sumida et al. | 296/65.09 |
| 2005/0285424 A1 * | 12/2005 | Yokoyama et al. | 296/37.14 |
| 2006/0066123 A1 * | 3/2006 | Tsujibayashi et al. | 296/65.09 |
| 2006/0214477 A1 * | 9/2006 | Fukada et al. | 297/15 |
| 2007/0046074 A1 * | 3/2007 | Satta et al. | 297/15 |
| 2007/0126253 A1 * | 6/2007 | Nabil et al. | 296/65.09 |
| 2007/0273172 A1 * | 11/2007 | McLaughlin et al. | 296/66 |
| 2007/0278833 A1 * | 12/2007 | Park et al. | 297/15 |
| 2008/0150312 A1 * | 6/2008 | Lehr et al. | 296/65.08 |
| 2008/0169668 A1 * | 7/2008 | Muramatsu | 296/37.14 |

FOREIGN PATENT DOCUMENTS

| | | |
|---|---|---|
| FR | 2 877 283 A1 | 5/2006 |
| JP | 2001-328473 A | 11/2001 |

\* cited by examiner

LAYOUT FOR AN AUTOMOBILE SEAT RETRACTABLE INTO A WELL OF THE FLOOR OF THE SAID AUTOMOBILE AND AUTOMOBILE INCLUDING SUCH A SEAT

BACKGROUND OF THE INVENTION

The present invention relates to the layout for an automobile vehicle seat retractable into a stowage well made in the floor of the said vehicle.

More especially, the invention relates to a retractable seat of the type including a backrest foldable against the seat pan, the whole being retractable into the well. For this, the seat pan is movable on the floor by pivoting towards the rear between a current utilization position and a retracted position in which the seat pan is located in the well, after pivoting through around one half of a turn from the current position. In the retracted position, the seat pan is located in the well more or less horizontal, the bottom of the seat pan facing upwards and the backrest then being below the seat pan in the bottom of the well.

DESCRIPTION OF THE RELATED ART

This type of seat is already known especially by US-2001/026075, U.S. Pat. No. 5,269,581, JP-2001/206119, JP-2001/328473. In all of these systems, for the retraction of the seat, the backrest is first of all folded down onto the seat pan, then the seat pan and backrest assembly is pivoted towards the rear into the well. In a corresponding manner, to return the seat to the current utilization position, the seat pan and backrest assembly must be extracted from the well by pivoting it forwards, then the backrest deployed. It is therefore always necessary to pass via the intermediary position, commonly called "table position", where the backrest is folded down more or less horizontally onto the seat pan. Two movements have necessarily to be done to go from the current utilization position to the table position, then from this position to the retracted position, and vice versa. Moreover, it is practically indispensable that the operator be placed, on one hand, at the rear of the seat for the phase where the seat pan is pivoted into and out of the well and, on the other hand, towards the front or on the side of the seat to fold down or redeploy the backrest. This obliges the operator to move in relation to the vehicle to achieve a complete operation. Also, the backrest must be locked in relation to the seat pan in table position to prevent unwanted tipping of the backrest in relation to the seat pan when this is pivoted towards the rear.

SUMMARY OF THE INVENTION

The aim of the present invention is to solve these problems and, in particular, to facilitate the change from the current utilization position to the retracted position and vice versa by limiting the number of movements required and by allowing the operator to do the complete operation from the rear of the seat, that is from the boot, without the need to enter into the vehicle to retract the seat.

With these targets in mind, the subject of the invention is a layout for an automobile vehicle seat retractable into a stowage well made in the floor of the said vehicle, the seat including a backrest foldable against the seat pan and the seat pan being movable on the floor by pivoting towards the rear between a current utilization position and a retracted position in which, after pivoting of around one half of a turn, the seat pan is located in the well more or less horizontal, the bottom of the seat pan facing upwards and the backrest then being below the seat pan in the bottom of the well.

According to the invention, this layout is characterized in that the seat pan is supported by a seat pan support which is hinged on the floor to allow the said pivoting of the seat pan, and the backrest is attached to the floor of the vehicle by a first rod hinged on the backrest and on the floor respectively so that the pivoting of the seat pan towards the rear is accompanied by the pivoting of the backrest towards the seat pan and the pivoting of the seat pan towards the front accompanies the deployment of the backrest.

Thanks to the invention, the seat retraction and deployment operations can thus be done in a single movement by handling the seat, for example, either by the top of the backrest, or by the seat pan, but, in all cases, without the need to act separately once on the backrest and once on the seat pan.

The hinge axes of the backrest in relation to the seat pan, of the seat pan in relation to the floor, of the rod in relation to the floor and of the rod in relation to the backrest respectively are located so as to form the apexes of a deformable quadrilateral determined in such a way that the pivoting of the seat pan by around one half of a turn, that is the predetermined pivoting angle between the current utilization position and the retracted position, causes the pivoting of the backrest in relation to the seat pan by around one quarter of a turn, that is through the angle required to fold the backrest down onto the seat pan.

The arrangement of the rod and of the various pivoting and hinge points, that is the apexes of the said quadrilateral, is such that, when the seat pan pivots towards the rear towards the retracted position, this results in a rotation of the backrest hinge axis on the seat pan around the pivoting axis of the seat pan on the floor. The first rod then causes the simultaneous folding down of the backrest towards the seat pan and when the seat pan is pivoted towards the front towards the current utilization position, the first rod causes the deployment of the backrest in relation to the seat pan.

The hinge axis of the backrest on the seat pan must therefore be at a sufficient distance above the pivoting axis of the seat pan on the floor so that there is a sufficiently ample displacement of the hinge axis of the backrest on the seat pan capable of generating the said deformation of the deformable quadrilateral.

Preferentially again, the hinge axis of the rod in relation to the floor and the pivoting axis of the seat pan in relation to the floor are located on the same support flange attached to the floor which allows the seat assembly to be preinstalled on the said flange and then to only have to attach this flange to the floor when installing the seat in the vehicle.

According to a complementary arrangement, a second rod connects a front leg, hinged on the seat pan support towards the front of the seat pan, to the floor. The position of the hinge axis of the second rod on the floor is determined so as to induce the folding of the said front leg against the bottom of the seat pan support when the seat is tilted towards the rear in retracted position in the well.

According to another arrangement, the seat pan is installed so as to slide in the forward-rearward direction on the seat pan support, this arrangement allowing the longitudinal position of the seat pan to be adjusted and, by using the first rod, to simultaneously modify the tilt angle of the backrest.

The subject of the invention is also an automobile vehicle including a seat arrangement as defined above. The seat can especially be a rear seat, and a trap door being provided to close the well when the seat is in current utilization position and in retracted position.

Other features and advantages will become apparent on reading the following description of such an automobile vehicle seat arrangement in compliance with the invention.

BRIEF DESCRITION OF THE DRAWING

Figure 2:
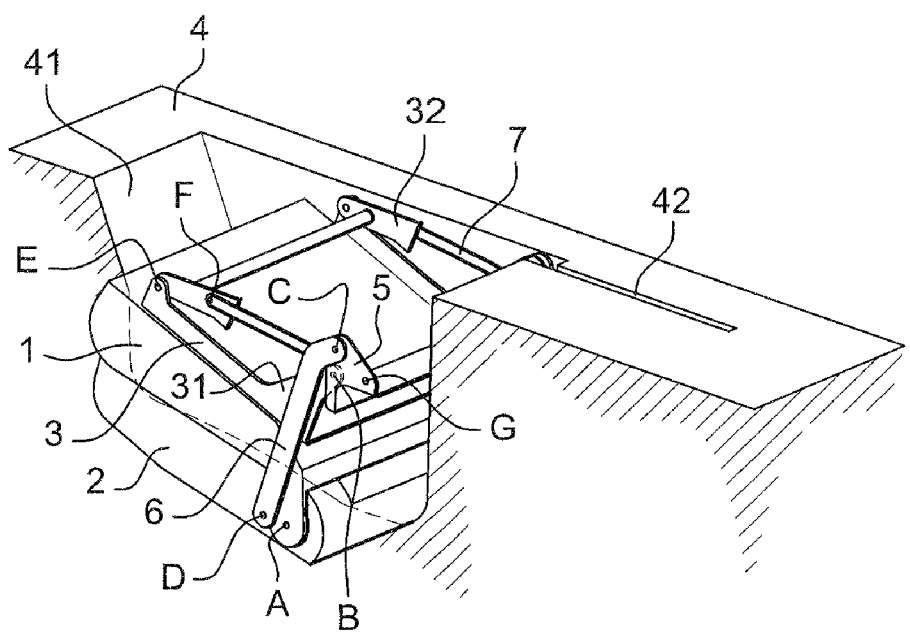
Figure 3:
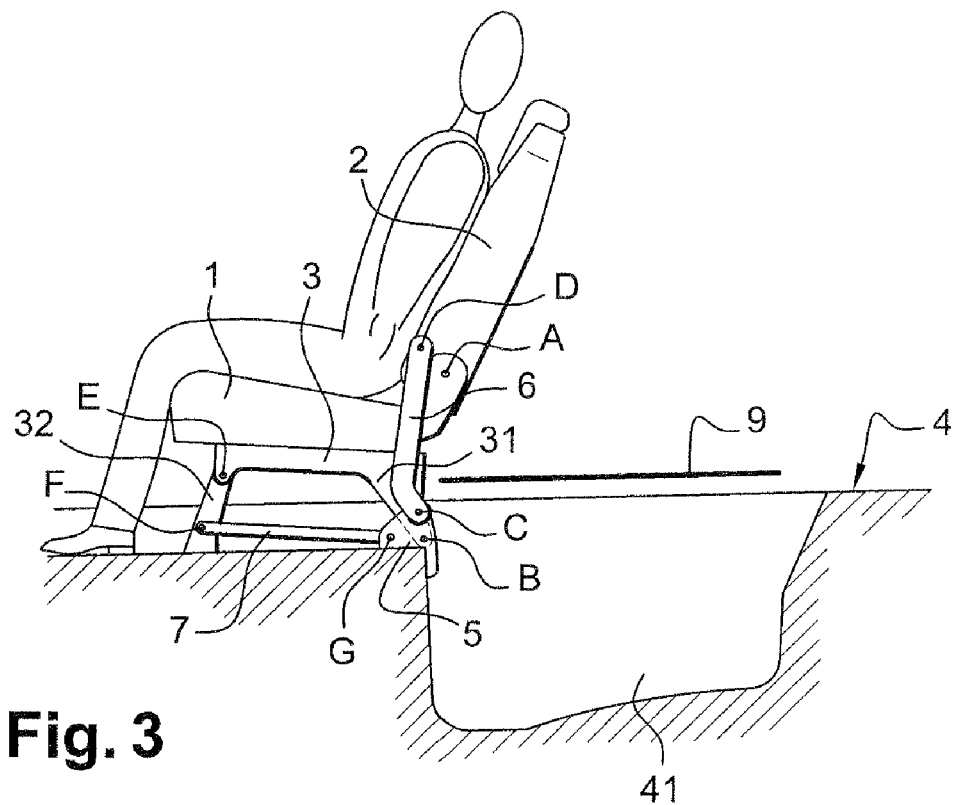
Figure 4:
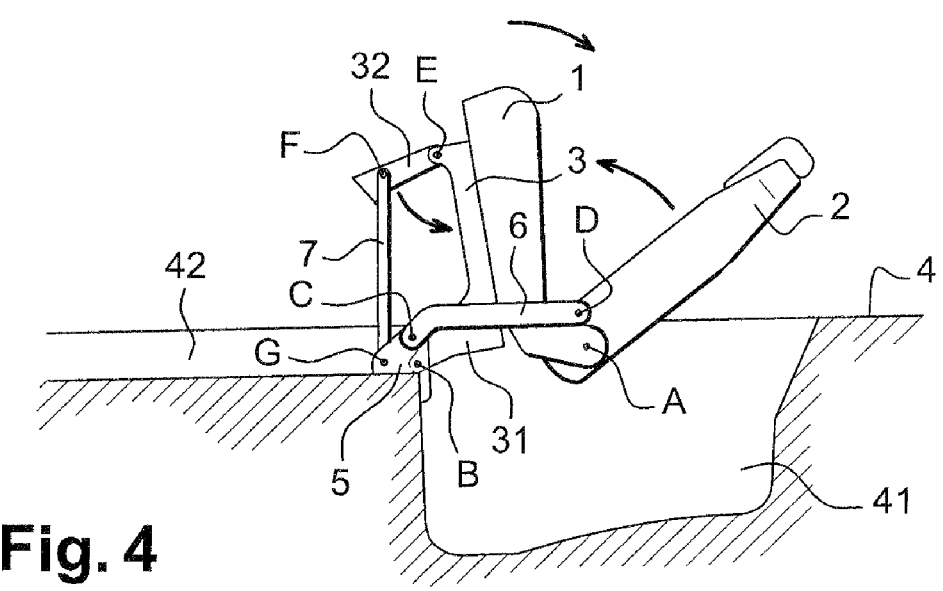
Figure 5:
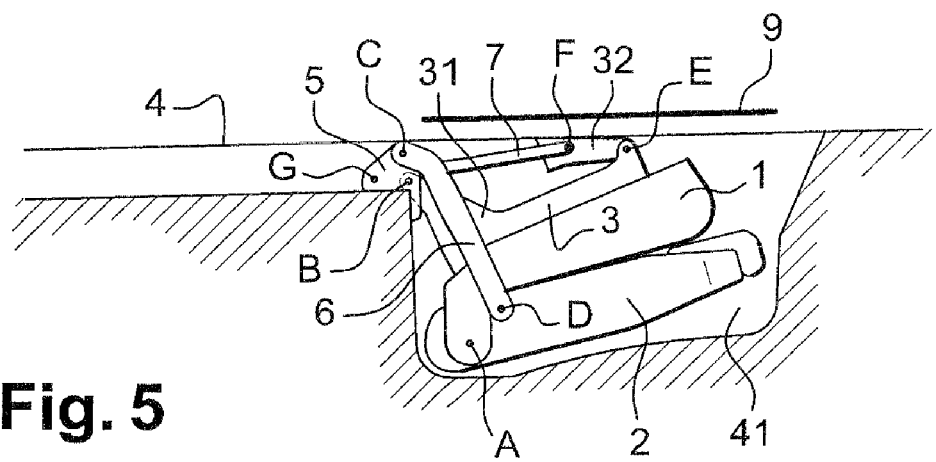
Figure 6:
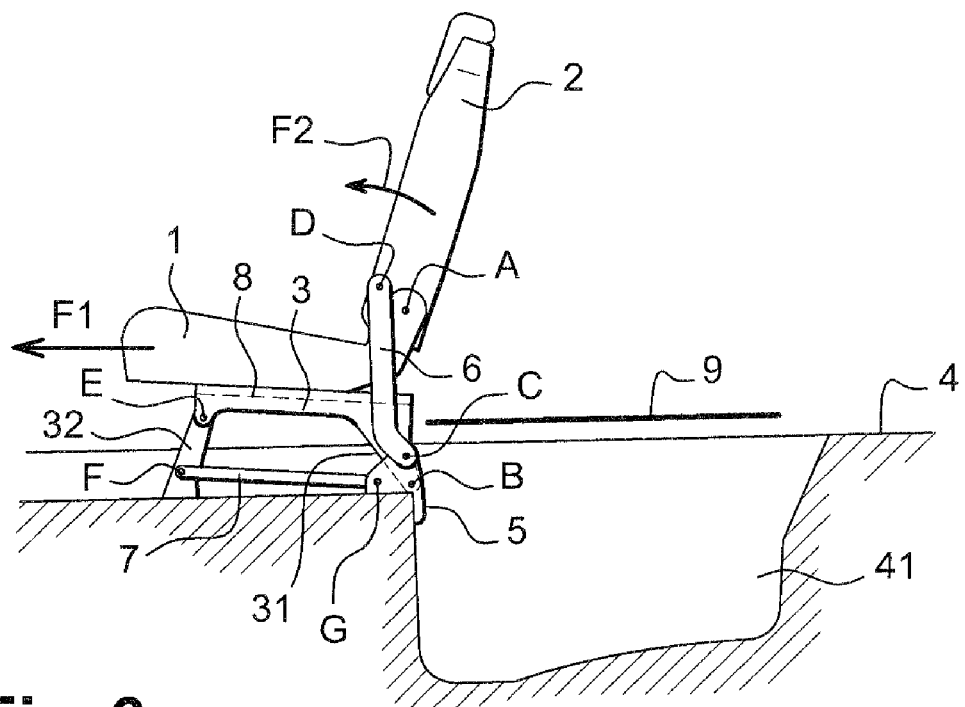

The description refers to the accompanying drawings, on which:

FIG. 1 is a perspective view of the seat placed on the floor of the vehicle in the current utilization position, FIG. 2 is a perspective view of the seat in the retracted position in a well of the floor, FIG. 3 is a side view of the seat in the current utilization position, occupied by a passenger, FIG. 4 is a side view of the seat in intermediary position when it is being retracted or deployed, FIG. 5 is a side view of the seat in retracted position, FIG. 6 is a side view of the seat in the current utilization position, in a variant with longitudinal adjustment of the position of the seat pan, with the seat pan in forward position and the backrest straightened.

DETAILED DESCRIPTION OF THE PREFERRED EMBODIMENTS

The seat shown on the various figures includes a seat pan 1 and a backrest 2 installed so as to pivot on the seat pan around hinge axis A.

The seat pan 1 is installed on a seat pan support 3 which includes a rear leg 31 installed so as to pivot in relation to the floor 4 of the vehicle around a pivoting axis B, located on the lower part of a support flange 5. the support flange 5 is attached to the floor 4, to the front of a well 41 made in the floor and intended to accommodate the seat in retracted position.

The backrest 2 is, moreover, attached to the seat pan support 3 by a first rod 6. The first rod 6 is installed and hinged by the lower end on the support flange 5, around an axis C fixed in relation to the floor 4, and by its other end onto the backrest, around an axis D. As stated previously, the hinge axis A of the backrest on the seat pan must be sufficiently above the pivoting axis B of the seat pan on the floor so that there will be, when the seat is retracted or deployed, a sufficiently ample displacement of the hinge axis A of the backrest on the seat pan, capable of generating the said deformation of the deformable quadrilateral ABCD. This condition is easily obtained by the presence of the seat pan support 3 and the rear leg 31 which ensure that there is a sufficient distance between the seat pan and the floor and, by the fact that the hinge axis A of the backrest is offset above the seat pan to, in a current manner, allow the folding down of the backrest against the seat pan.

Moreover, as stated above, the relative pivotings of the backrest 2 in relation to the seat pan 1, and of the seat pan 1 in relation to the floor 4, have a pivoting angle ratio of around one half, so that, from the current utilization position, the backrest pivots by around one quarter of a turn towards the seat pan to fold down against it when the seat pan pivots by around half a turn to retract into the well 41. In order to obtain these relative pivoting movements of the backrest 2 in relation to the seat pan 1, and of the seat pan 1 in relation to the floor 4, in this pivoting angle ratio of around 1/2, the hinge axis C of the rod 6 in relation to the floor 4 is located more or less vertically above the pivoting axis B of the seat pan in relation to the floor, and the hinge axis D of the rod 6 on the backrest 2 is located forward of the hinge axis A of the backrest on the seat pan.

A front leg 32 is installed and hinged on the seat pan support at an axis E located towards the front of the seat pan. A second rod 7 connects the front leg, at a hinge axis F, to the support flange 5, at an axis G which is therefore fixed in relation to the floor. The arrangement of these various axes is determined so that the pivoting towards the rear of the seat pan is accompanied by the folding of the front leg 32 against the bottom of the seat pan so that this leg is also retracted against the seat pan when it is retracted into the well. This allows the overall size of the seat to be limited in retracted position and therefore allows the dimensions of the well to be limited avoiding the front leg from protruding upwards as can be clearly seen on FIGS. 2 and 5. As can be seen on FIG. 2 especially, a groove 42 is made in the floor 4 to accommodate the rod 7 in the current utilization position of the seat, this participating in allowing the hinge axes B, C and C to be positioned as low as possible in relation to the surface of the floor and therefore preventing the retracted seat from protruding above the main surface of the floor whilst however limiting the depth required for the well.

Locking means of a known type are used to lock the front leg 32 onto the floor in the current utilization position of the seat.

To bring the seat into retracted position, it suffices to induce the pivoting of the seat towards the rear, for example by raising the front of the seat, after having unlocked the front leg. This leads, by the deformation of the above mentioned deformable quadrilateral ABCD, to the pivoting of the backrest towards the seat pan and the simultaneous folding of the front leg 32, as shown by the arrows on FIG. 4. It can be seen, in the intermediary situation on FIG. 4, that it suffices, thanks to the link made by the first rod 6, to hold either the seat pan or the backrest, without the risk that the other element pivots alone under the effect of its own weight, which makes the maneuver possible using only one hand.

By continuing the movement, the seat is thus brought into its retracted position shown on FIG. 5, the backrest 2 completely folded against the top of the seat pan and located in the bottom of the well 41 and covered by the seat pan 1. The front leg 32 is brought towards the seat pan, more or less parallel to the floor. A trap door 9, which covers the well 4 when the seat is in current utilization position, can be placed back over the seat retracted in the well to cover the well and hide the seat and act as floor for the boot.

To bring the seat into the current utilization position, it suffices to extract it from the well, for example by raising it by the top of the backrest. This raises the complete seat simultaneously pivoting the seat pan and the front leg in the direction opposite to that stated previously, until the seat pan is back in its initial position, the front leg resting on the floor to which it can be automatically relocked. Also, in this deployment operation, a single hand is sufficient to do the complete movement.

According to a variant, the seat pan is installed on the seat pan support by means of longitudinal slides 8, shown by dotted lines on FIG. 6, and equipped with locking means of known type. Thanks to these slides, the seat pan 1 can move on its front support 3 towards the rear and vice versa, as shown, for example, by arrow F1 on FIG. 6. Sliding the seat pan forwards brings forwards the backrest and therefore the pivoting axis D of the first rod on the backrest with it. This causes the backrest to straighten by pivoting around hinge axis A, caused by the said rod 6, as shown by arrow F2. Rod 6 thus ensures, in addition to its specific function during the retraction or the deployment of the seat, a comfort adjustment by automatic adaptation of the tilt angle of the backrest typically between angles of 19° and 25° from the vertical, to the sliding of the seat pan.

The invention claimed is:

1. A layout for an automobile vehicle seat retractable into a stowage well (41) made in a floor (4) of a vehicle, comprising:
   a seat with a backrest (2) and a seat pan (1), the backrest (2) being foldable onto the seat pan (1), and the seat pan being movable on the floor between a current utilization position and a retracted position by a pivoting towards the rear of the vehicle,
   wherein the seat pan, in the retracted position, is located in the well and more or less horizontal, the bottom of the seat pan is facing upwards, and the backrest is below the seat pan in the bottom of the well,
   wherein the seat pan (1) is supported by a seat pan support (3), the seat pan support (3) being hinged on the floor (4) and configured to allow the pivoting of the seat pan, and
   wherein the backrest (2) is connected to the floor of the vehicle by a first rod (6), the first rod (6) being hinged on the backrest and on the floor, respectively, so that i) the pivoting of the seat pan towards the rear is accompanied by a pivoting of the backrest towards the seat pan, and ii) a pivoting of the seat pan towards the front of the vehicle is accompanied by a deployment of the backrest.

2. The seat layout according to claim 1, wherein a hinge axis (A) of the backrest (2) in relation to the seat pan (1), a pivoting axis (B) of the seat pan (1) in relation to the floor (4), a hinge axis (C) of the first rod (6) in relation to the floor (4), and a hinge axis (D) of the first rod (6) in relation to the backrest (2) are all located so as to form apexes of a deformable quadrilateral (ABCD) configured such that a pivoting of the seat pan through a predetermined pivoting angle, between the current utilization position and the retracted position, induces a pivoting of the backrest in relation to the seat pan through an angle required to fold down the backrest onto the seat pan.

3. The seat layout according to claim 1, wherein the hinge axis (C) of the first rod (6) in relation to the floor (4) and the pivoting axis (B) of the seat pan (1) in relation to the floor are located on a same support flange (5) attached to the floor.

4. The seat layout according to claim 1,
   wherein a hinge axis (C) of the first rod (6) in relation to the floor (4) is located more or less vertically above a pivoting axis (B) of the seat pan (1) in relation to the floor, and
   wherein a hinge axis (D) of the first rod (6) on the backrest (2) is located forward of a hinge axis (A) of the backrest (2) on the seat pan (1).

5. The seat layout according to claim 1, wherein a second rod (7) connects a front leg (32), hinged on the seat pan support (3) at the front of the seat pan, to the floor (4).

6. The seat layout according to claim 1, wherein the seat pan (1) is configured to slide in a forward-rearward direction on the seat pan support (3).

7. An automobile vehicle comprising a seat layout according to claim 1.

8. The automobile vehicle according to claim 7,
   wherein the seat is a rear seat, and
   wherein a trap door (9) is provided to close the well when the seat is in current utilization position and in retracted position.

9. The seat layout according to claim 2,
   wherein the hinge axis (C) of the first rod (6) in relation to the floor (4) is located more or less vertically above the pivoting axis (B) of the seat pan (1) in relation to the floor, and
   wherein the hinge axis (D) of the first rod (6) on the backrest (2) is located forward of the hinge axis (A) of the backrest (2) on the seat pan (1).

* * * * *